(12) United States Patent
Gretz (10) Patent No.: US 7,820,911 B1
(45) Date of Patent: Oct. 26, 2010

(54) REVERSIBLE PROTECTIVE CABLE CHUTE ASSEMBLY FOR ROUTING LOW VOLTAGE CABLES THROUGH WALLS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 444 days.

(21) Appl. No.: 12/082,030

(22) Filed: Apr. 8, 2008

Related U.S. Application Data (63) Continuation-in-part of application No. 12/075,326, filed on Mar. 11, 2008.

(51) Int. Cl.
*H02G 3/14* (2006.01)
(52) U.S. Cl. ............... 174/66; 174/67; 174/53; 220/241; 220/242; 220/3.8; D8/350; D13/177
(58) Field of Classification Search ............... 174/66, 174/67, 53, 480, 481, 135, 668; 220/241, 220/242, 3.2, 3.8, 3.5; D8/350–353, 399; D13/156, 177, 152, 154, 158, 173, 169, 171, D13/146, 147, 162; 439/536
See application file for complete search history.

(56) References Cited

U.S. PATENT DOCUMENTS

| | | | | |
|---|---|---|---|---|
| 4,688,747 A | * | 8/1987 | Helmsdorfer et al. ......... 174/67 |
| 5,124,506 A | * | 6/1992 | Briggs et al. ................... 174/67 |
| D370,890 S | * | 6/1996 | Tiberio, Jr. ................. D13/156 |
| D399,829 S | * | 10/1998 | Reed .......................... D13/156 |
| 6,064,003 A | | 5/2000 | Moore et al. |
| 6,793,524 B2 | | 9/2004 | Clark et al. |
| 6,840,483 B1 | | 1/2005 | Dickens |
| D502,386 S | * | 3/2005 | Provenzano et al. ......... D8/350 |
| D503,156 S | | 3/2005 | Provenzano |
| 7,141,744 B2 | | 11/2006 | Cloutier |
| D540,656 S | * | 4/2007 | Corbin ........................ D8/353 |
| D554,475 S | | 11/2007 | Gorin et al. |
| D593,842 S | * | 6/2009 | Corbin ........................ D8/353 |
| 7,554,036 B1 | * | 6/2009 | DeCosta ....................... 174/66 |
| 7,563,979 B1 | * | 7/2009 | Gretz ........................... 174/66 |
| 7,654,405 B2 | * | 2/2010 | Provenzano et al. ........ 220/241 |
| 2008/0110886 A1 | | 5/2008 | Provenzano et al. |

\* cited by examiner

*Primary Examiner*—Angel R Estrada (57) ABSTRACT

A reversible protective cable chute assembly for routing low voltage cables through walls. The protective cable chute includes a cover plate with an integral cable shield and a removable panel. The cover plate and panel each include an aperture therein for securing the cable chute assembly to an electrical box or low voltage frame. An alignment device is provided on the removable panel to enable rapid alignment of the panel with either side of the cable chute. An opening and passageway is provided in the cable shield portion of the cover plate for receiving low voltage cables for the purpose of routing them through the wall and into an adjacent room. The removable panel provides a convenient means for adding or removing cables after the initial installation.

20 Claims, 9 Drawing Sheets

REVERSIBLE PROTECTIVE CABLE CHUTE ASSEMBLY FOR ROUTING LOW VOLTAGE CABLES THROUGH WALLS

This application is a Continuation-In-Part of U.S. patent application Ser. No. 12/075,326 filed Mar. 11, 2008 and still pending, which is commonly owned by the assignee of the present invention and the entire contents of which are incorporated herein by reference.

FIELD OF THE INVENTION

This invention relates to the installation of low voltage wiring in buildings and specifically to a two-piece protective cable chute assembly for routing low voltage electrical or communications cables through interior walls.

BACKGROUND OF THE INVENTION

In U.S. patent application Ser. No. 12/075,326 filed Mar. 11, 2008, there was disclosed a reversible protective cable chute with an integral cover plate for use in routing low voltage wires and cables through interior walls. The reversible cable chute included a plate with a cable shield extending there from. The cable chute could be mounted in any of four possible orientations depending on the requirements of the location and the particular installation. The reversible cable shield provided an easy, convenient means of covering an electrical box or low voltage frame for the purpose of routing low voltage wires or cables there through.

Although the aforementioned reversible cable chute provided a device for improved routing of low voltage cables through walls, the current invention provides further enhancements to the functionality of the reversible cable shield. By providing a two-piece cover plate, the reversible cable chute assembly of the present invention enables the addition of cables after initial installation without having to remove the cable chute from the electrical box. Also, if the installer forgot to install the single-piece cable chute initially and installed the cables, subsequent installation of the single-piece cable chute would require that the cables be disconnected from the low voltage device and the single-piece chute guided over the cables to secure it to the electrical box. The two-piece cable chute assembly of the present invention enables an installer to route additional cables or remove previously inserted electrical cables by simply removing a panel from the cover plate of the assembly and replacing the panel after the cables have been routed there through.

SUMMARY OF THE INVENTION

The invention is a reversible protective cable chute assembly for routing low voltage cables through walls. The protective cable chute includes a cover plate with an integral cable shield and a removable panel. The cover plate and panel each include an aperture therein for securing the cable chute assembly to an electrical box. An alignment device is provided on the removable panel to enable rapid alignment of the panel with either side of the cable chute. An opening and passageway is provided in the cable shield portion of the cover plate for receiving low voltage cables for the purpose of routing them through the wall and into an adjacent room. The removable panel provides a convenient means for adding or removing cables after the initial installation.

OBJECTS AND ADVANTAGES

Several advantages are achieved with the reversible protective cable chute assembly of the present invention, including:

(1) The reversible protective cable chute assembly provides a convenient device for routing low voltage cables through walls and easily adding to or removing cables after initial installation.

(2) The cable chute assembly includes embodiments that enable use with a conventional single or conventional double gang electrical box or low voltage frame for providing cable passageways through walls.

(3) Several orientations or configurations are available to the installer to provide several options for an attractive installation. The reversible protective cable chute assembly can be mounted with the cable shield extending outward or inward and with the nose portion opening oriented upward or downward, thereby enabling selection of one of four possible mounting installations for added flexibility in routing cables through walls.

(4) Mounting the protective cable chute assembly with the cable shield extending inward enables placement of low voltage components in close proximity of the wall-mounted cable chute.

(5) Use of the reversible protective cable chute of the present invention is compatible with conventional electrical boxes and low voltage frames thereby enabling an installer to utilize existing installed electrical boxes and low voltage frames for routing low voltage cables and avoiding the need to install specialized boxes.

These and other objects and advantages of the present invention will be better understood by reading the following description along with reference to the drawings.

INDEX TO REFERENCE NUMERALS IN DRAWINGS 20 reversible protective cable chute assembly
22 cover plate
24 removable panel
26 cable shield
28 mounting aperture in cover plate
29 mounting aperture in panel
30 end portion of cover plate
32 aperture in end portion
34 post
36 alignment arrangement
38 fastening arrangement
40 fastener
39 electrical box
42 first end of cover plate
44 second end of cover plate
46 front surface of cover plate
48 rear surface of cover plate
50 opening in cover plate
54 sidewalls of cable shield
56 outer wall of cable shield
58 lower edge
60 cable opening
61 axis perpendicular to the front surface of the cover plate
62 countersunk area
64 raised periphery on cover plate
66 outer edge of cover plate
68 thin interior plate portion
70 recessed area
72 front surface of panel
74 rear surface of panel
76 end of panel
78 central vertical axis through panel
80 countersunk area
82 boss
84 inner side of panel
86 outer side of panel
88 raised periphery
92 wall
94 vertical axis through cover plate
96 bore
98 planar horizontal portion of cable shield
100 vertical lip of cable shield
D1 distance interior plate portion is recessed from raised periphery
Θ1 angle of sloped portion of cable shield with respect to horizontal

DETAILED DESCRIPTION OF THE INVENTION

Figure 1:
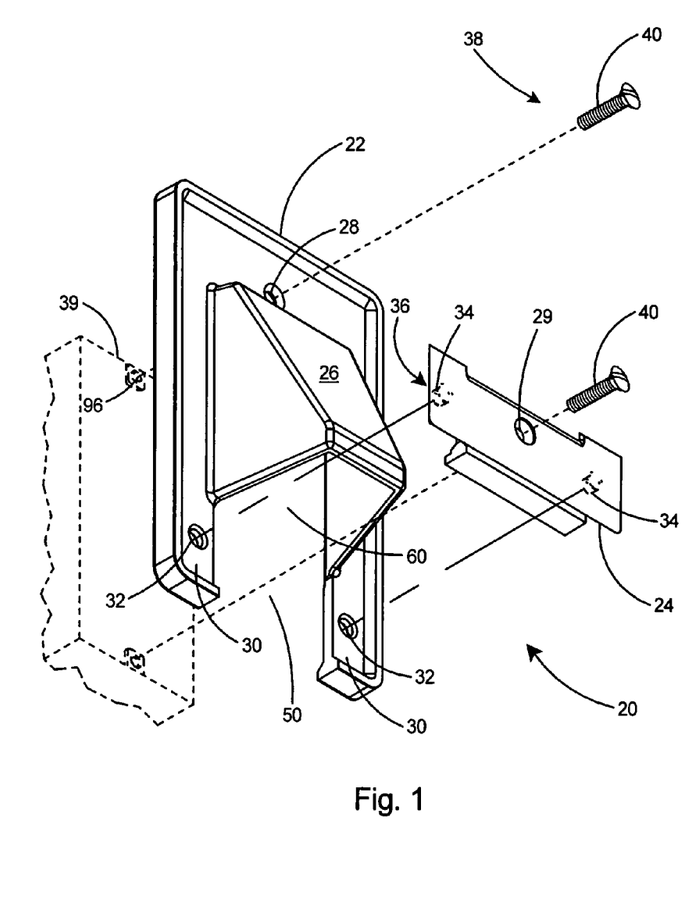
FIG. 1 is an exploded perspective view of a preferred embodiment of a reversible protective cable chute assembly in a first configuration according to the present invention depicting a cover plate and a removable panel.

Referring to FIG. 1 there is shown a preferred embodiment of the present invention, a reversible protective cable chute assembly 20. The reversible protective cable chute assembly 20 includes a cover plate 22 and a removable panel 24. The cover plate 22 includes an outward-extending cable shield 26. One mounting aperture 28 is provided in the cover plate 22 and a separate mounting aperture 29 in the panel 24. The cover plate 22 includes end portions 30 with apertures 32 therein and the panel 24 includes posts 34 (phantom lines) on the rear side of the panel. The apertures 32 in the cover plate 22 and posts 34 on the removable panel 24 form an alignment arrangement 36 for rapidly aligning the panel 24 with the cover plate 22. A fastening arrangement 38 for securing the cover plate 22 and panel 24 to an electrical box 39 or low voltage frame include the mounting aperture 28 in the cover plate 22, the mounting aperture 29 in the panel 24, and fasteners 40.

Figure 2:
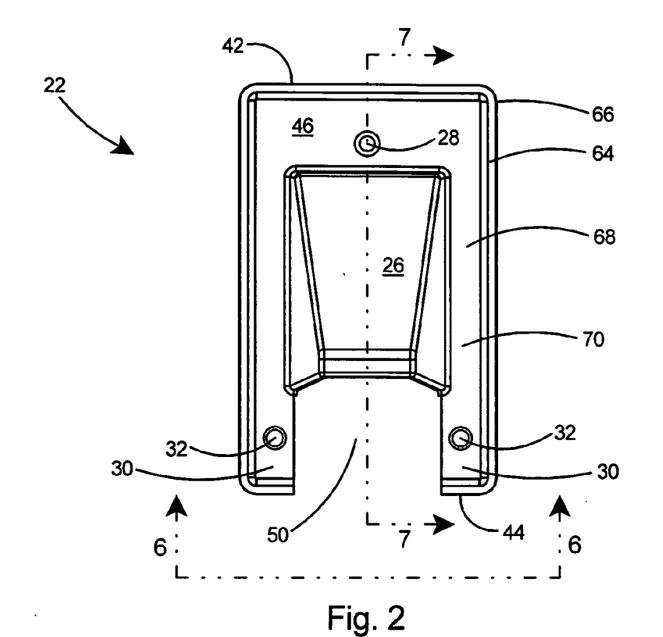
FIG. 2 is a front view of the cover plate portion of the protective cable chute assembly of FIG. 1.
Figure 3:
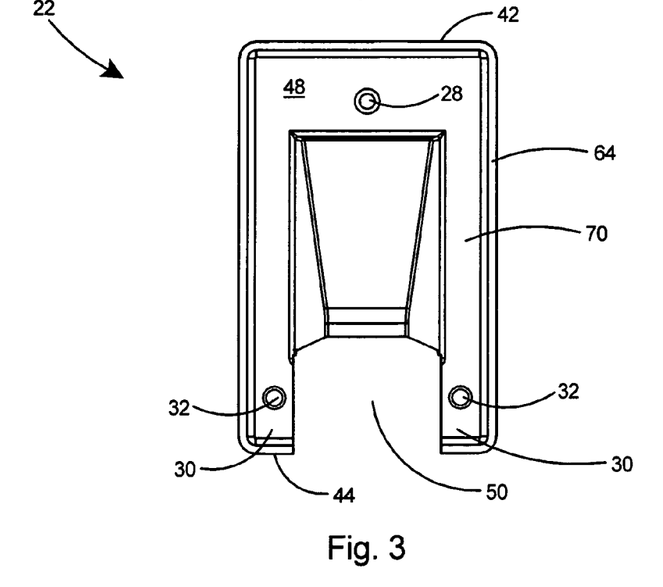
FIG. 3 is a rear view of the cover plate depicted in FIG. 2.

With reference to FIGS. 2 and 3, the cover plate 22 includes a first end 42, a second end 44, a front surface 46, and a rear surface 48. An opening 50 extends inward from the second end 44 of the cover plate 22 thereby defining two outwardly extending end portions 30 at the second end 44 of the cover plate 22.

Figure 4:
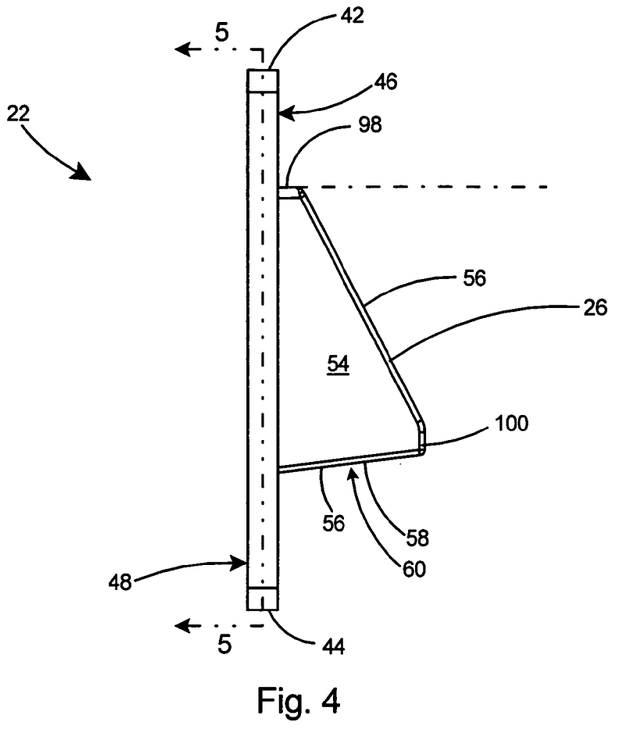
FIG. 4 is a side view of the cover plate depicted in FIG. 2.
Figure 5:
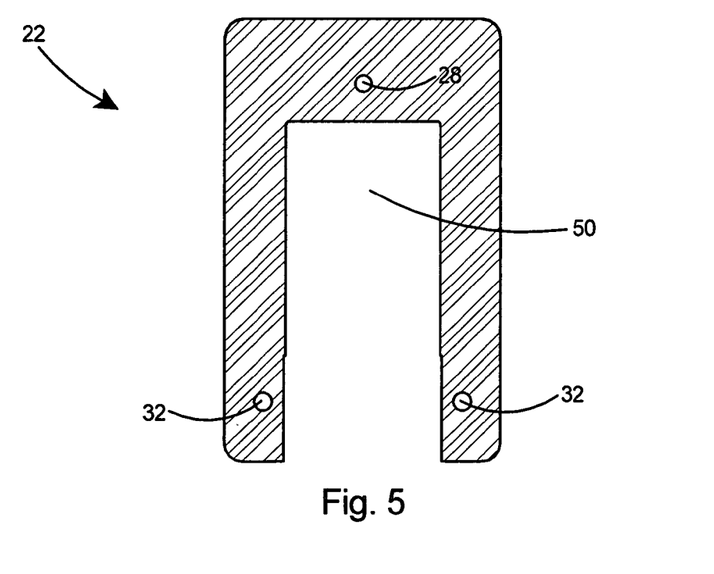
FIG. 5 is a sectional view of the cover plate taken along line 5-5 of FIG. 4.

Referring to FIGS. 4 and 5, the cable shield 26 extends outward from the front surface 46 of the cover plate 22 around a portion of the opening 50. The cable shield 26 includes sidewalls 54 and an outer wall 56. The outer wall 56 and the sidewalls 54 of the cable shield 26 terminate in a lower edge 58. As shown in FIG. 5, the opening 50 is rectangular shaped and extends inward from the second end 44 of the cover plate 22. The opening 50 extends more than half the length of the cover plate 22 and to approximately ¾ of the distance through the cover plate 22. The opening 50 ensures that the cover plate 22 will include an open passageway behind the cable shield 26.

Figure 6:
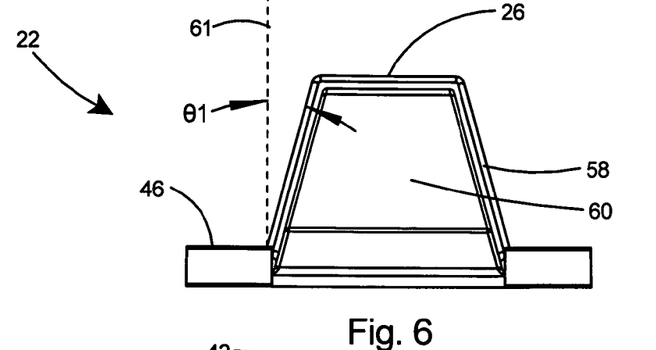
FIG. 6 is an end view of the cover plate taken along line 6-6 of FIG. 2.
Figure 7:
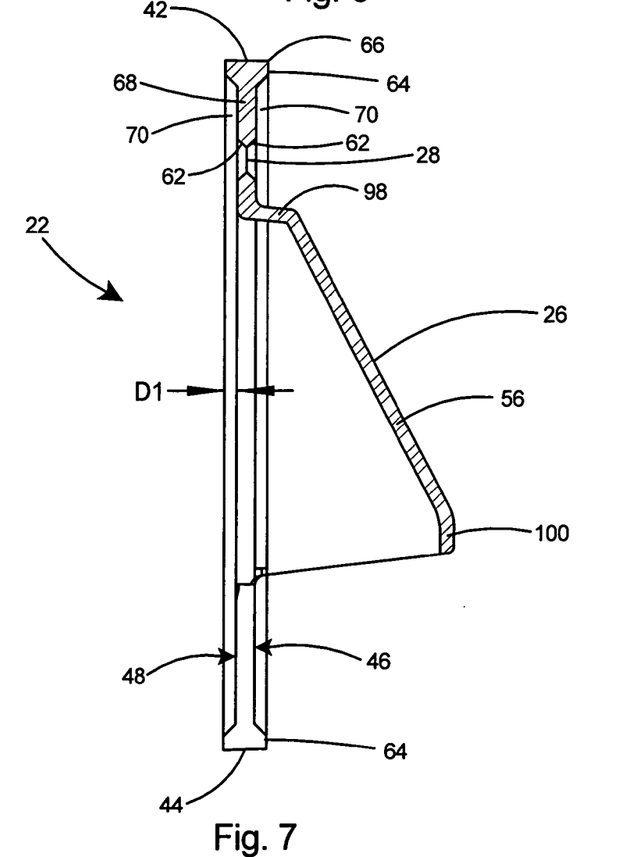
FIG. 7 is a sectional view of the cover plate taken along line 7-7 of FIG. 2.
Figure 8:
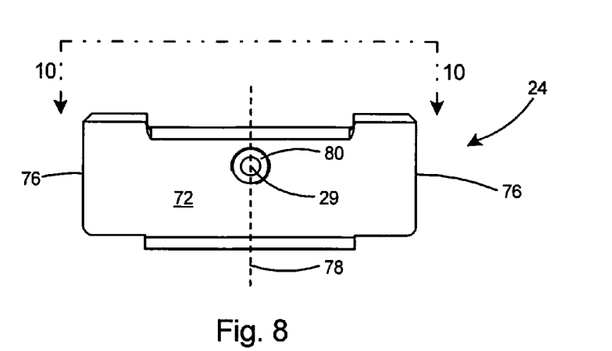
FIG. 8 is a front view of the panel portion of the protective cable chute assembly of FIG. 1.
Figure 9:
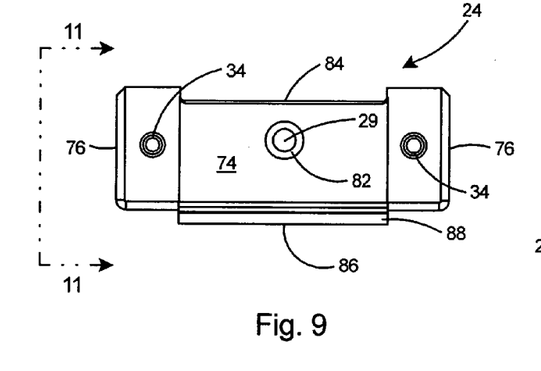
FIG. 9 is a rear view of the panel of FIG. 8.
Figure 10:
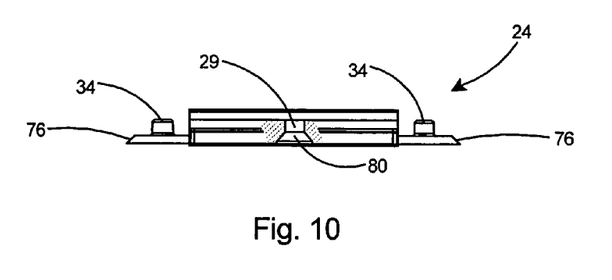
FIG. 10 is a top view of the panel taken along line 10-10 of FIG. 8.
Figure 11:
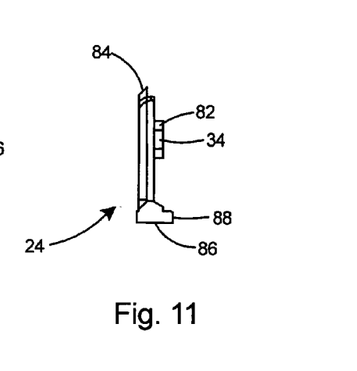
FIG. 11 is a side view of the panel taken along line 11-11 of FIG. 9.
Figure 12:
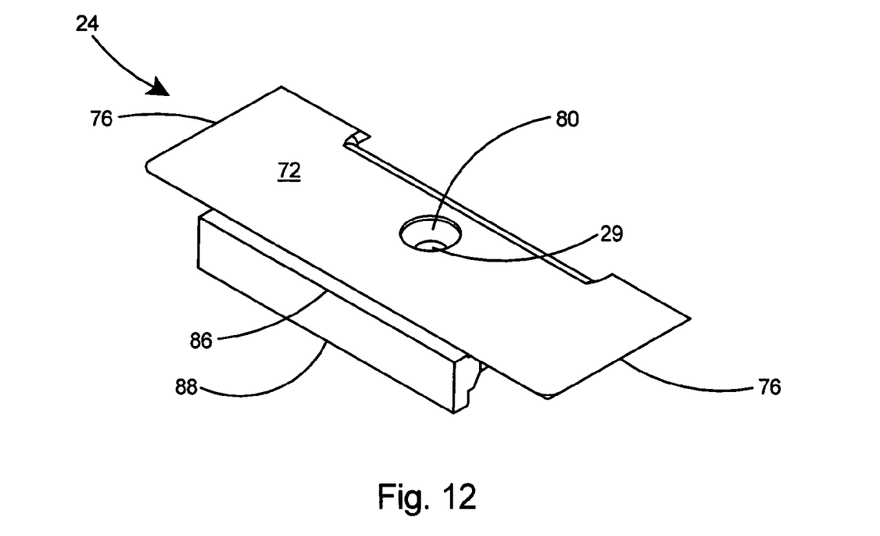
FIG. 12 is a front perspective view of the panel of FIG. 8.
Figure 13:
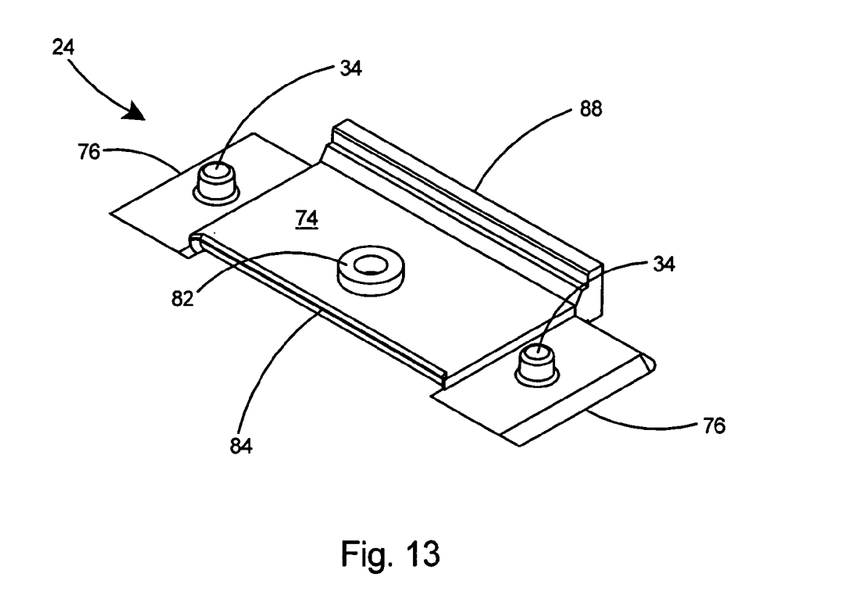
FIG. 13 is a rear perspective view of the panel of FIG. 8.

With reference to FIG. 6, the lower edge 58 of the cable shield 26 defines a cable opening 60. The cable opening 60 is substantially trapezoidal in shape as the sidewalls 54 of the cable shield 26 slope inward at angle with respect to the front surface 46 of the cover plate 22. Cable opening 60 is a substantially trapezoidal shape as a result of sidewalls 54 sloping inward at an angle of Θ1 with respect to an axis 61 perpendicular to the front surface 46 of the cover plate 22. Preferably, angle Θ1 is between 10 and 20 degrees. As shown in FIG. 7, a mounting aperture 28 is formed near the first end 42 of the cover plate 22. Mounting aperture 28 includes countersunk areas 62 on both the front surface 46 and rear surface 48 of the cover plate 22. Providing the countersunk areas 62 on both sides of the cover plate 22 enables the mounting aperture 28 to be a two-way aperture, which enables the mounting aperture 28 to accept fasteners 40 such as oval head or flat head mounting screws (see FIG. 1). Providing a two-way aperture also enables the cover plate 22 to be reversible with respect to an electrical box or low voltage frame it is mounted to as the countersunk areas 62 will be accessible regardless of which surface 46 and 48 of the cover plate 22 is facing outward.

As shown in FIGS. 2 and 7, the cover plate 22 of the reversible protective cable chute assembly of the present invention further includes a raised periphery 64 around the outer edge 66 of the cover plate 22. The cover plate 22 thus includes a thin interior plate portion 68 and a recessed area 70 on each of the front surface 46 and the rear surface 48 of the cover plate 22. The recessed area 70 on the front surface 46 of the cover plate 22 extends between the outward extending cable shield 26 and the raised periphery 64. As shown in FIG. 3, the recessed area 70 on the rear surface 48 of the cover plate 22 extends between the opening 50 and the raised periphery 64.

With reference to FIGS. 8-13, the panel 24 includes a front surface 72, a rear surface 74, and two ends 76. A mounting aperture 29 is provided along a central vertical axis 78 through the panel 24. The mounting aperture 29 includes a countersunk area 80 on the front surface 72 of the panel 24 and an outward extending boss 82 on the rear surface 74 of the panel 24. The panel 24 further includes an inner side 84, an outer side 86, and a raised periphery 88 along the outer side 86. Two posts 34 extend from the rear surface 74 of the panel 24 near the two ends 76.

With reference to FIG. 1, the reversible protective cable chute assembly 20 of the present invention is used to provide an attractive and functional cover for an electrical box 39 or low voltage frame. The reversible protective cable chute assembly 20 of the present invention may be mounted to an electrical box or low voltage frame in any one of four possible configurations by reversing the side of the plate with respect to the box and the wall and by flipping the cover plate 22 end to end. Thus, the cable chute assembly 20 may be mounted in any of four configurations including 1) with the cable shield 26 facing outward and the cable opening 60 facing down, 2) with the cable shield 26 facing outward and the cable opening 60 up, 3) with the cable shield 26 facing inward and the cable opening 60 facing down, and 4) with the cable shield 26 facing inward and the cable opening 60 facing up. FIG. 1 therefore depicts the reversible protective cable chute assembly 20 of the present invention mounted in a first configuration with the cable shield 26 facing outward and the cable opening 60 facing down. To mount the cable chute assembly 20 to the electrical box 39, the cover plate is secured to the electrical box 39 by securing fastener 40 through mounting aperture 28. Low voltage electrical cables (not shown) may then be routed through the cable opening 60. After all cables are routed through the cable opening 60, the panel 24 is aligned with the cover plate 22 by inserting posts 34 into apertures 32 in the cover plate 22. A second fastener 40 is then secured through aperture 29 in panel 24 to close the lower portion of opening 50 in cover plate 22. If additional low voltage cables are later routed through the cable chute assembly 20, the removable panel 24 is simply removed from the electrical box 39 by removing the fastener 40 holding the panel 24 to the box 39, the additional cables are routed into the box 39, and the panel 24 secured again to the box 39 with fastener 40. The removable panel 24 feature of the present invention is especially useful in those situations in which low voltage cables have previously been routed through uncovered boxes or frames. Homeowners often run low voltage cables through the boxes and later decide to place a cover over the box to create a more attractive cable installation. In prior art one-piece cable shields, all of the existing low voltage cables would need to the disconnected from the devices to which they were connected, the cable ends passed through the cable opening of the prior art cable shield, and the cable shield then secured to the box. The reversible protective cable chute assembly 20 of the present invention has the advantage of enabling a person to install the assembly 20 to the box or low voltage frame without having to disconnect all of the existing cables first. One simply separates the panel 24 from the cover plate 22, places the cover plate 22 over the existing cables through opening 50, connects the cover plate 22 to the electrical box 39 and then connects the panel 24 to the electrical box 39.

Figure 14:
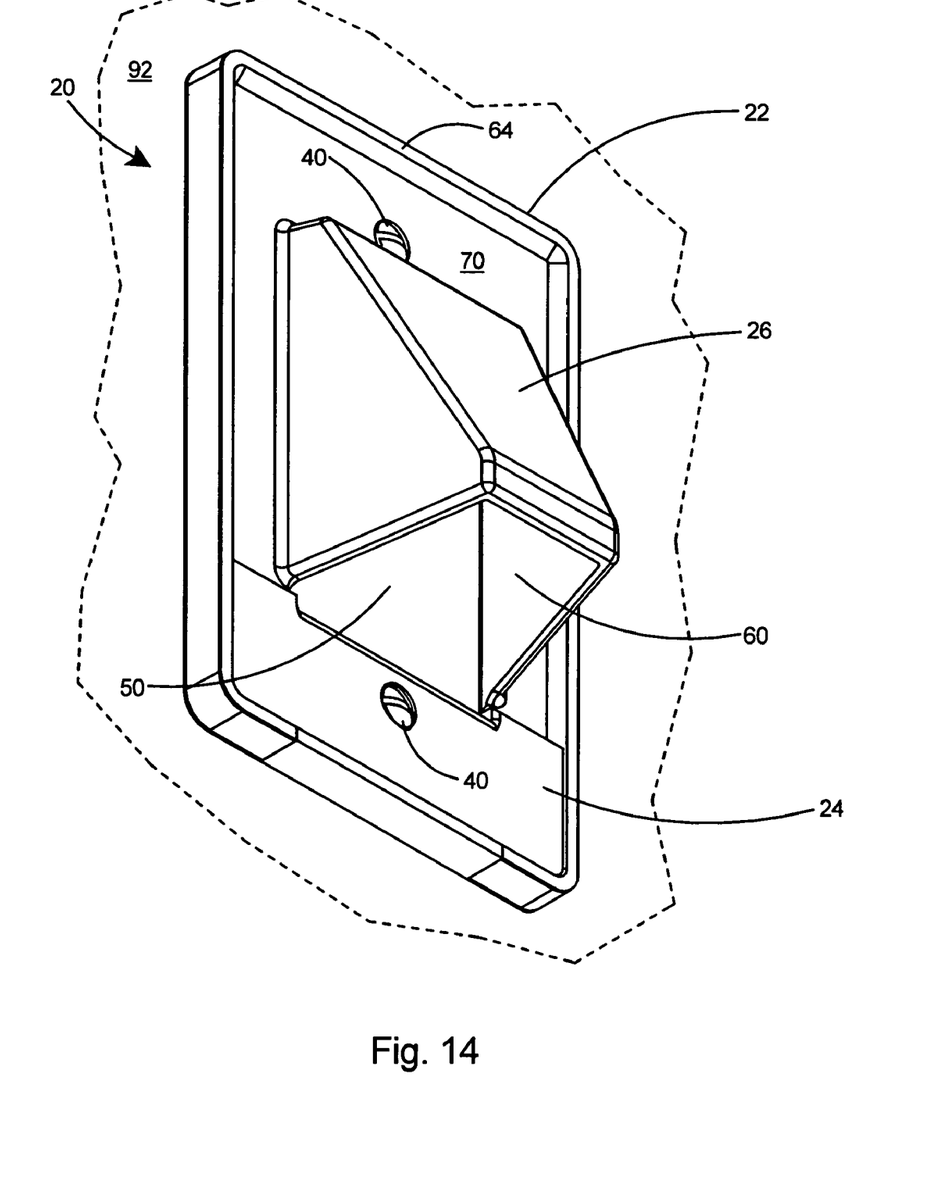
FIG. 14 is a perspective view of the reversible protective cable chute assembly of FIG. 1 after it has been secured to an electrical box.

With reference to FIG. 14 there is shown the reversible protective cable chute assembly 20 of FIG. 1 after it has been secured to the low voltage frame or electrical box. The electrical box or low voltage frame is out of view as the raised periphery 64 of the cover plate 22 extends beyond the box or frame. The raised periphery 64 of cover plate 22 therefore is seated flush against the wall 92.

Figure 15:
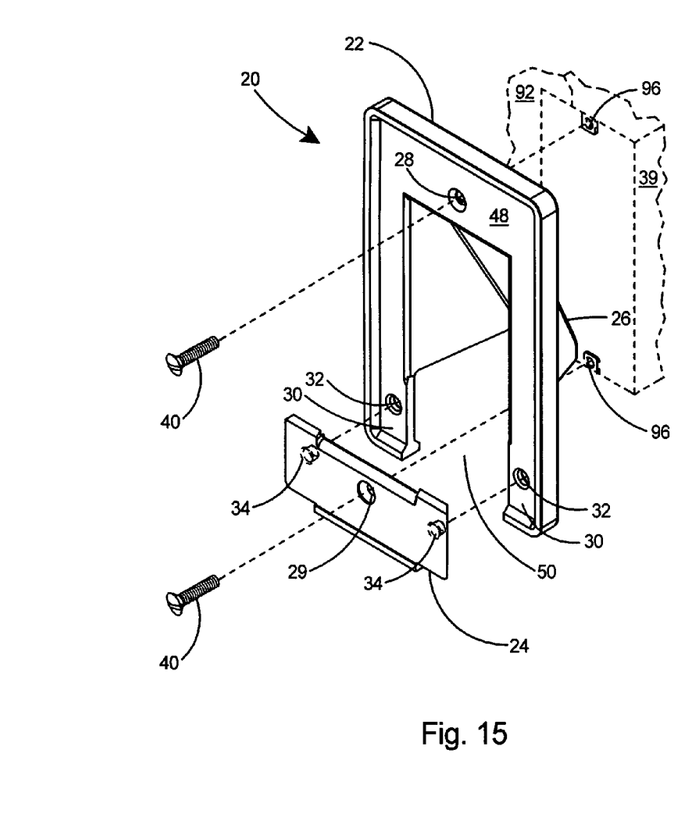
FIG. 15 is an exploded perspective view of the reversible protective cable chute assembly in a second configuration according to the present invention.
Figure 16:
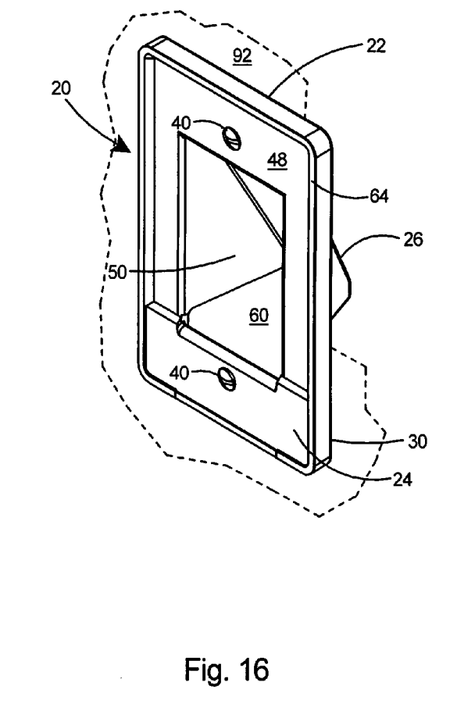
FIG. 16 is a perspective view of the reversible protective cable chute assembly of FIG. 15 after it has been secured to an electrical box.

Referring to FIGS. 15 and 16, there is shown a second configuration of the reversible protective cable chute assembly 20 of the present invention with respect to an electrical box 39 installed in a wall 92. In this configuration the cable shield 26 is oriented toward the electrical box 39. As shown in FIGS. 15 and 16, the removable panel 24 of the cable chute assembly 20 can be secured against the rear surface 48 of the cover plate 22. After being secured to the electrical box, the panel 24 extends between the end portions 30 of the cover plate 22 and closes the bottom portion of the opening 50 in the cover plate 22. The removable panel 24 may thus be removed from the electrical box or low voltage frame without first removing the cover plate 22 from the electrical box or low voltage frame.

Figure 17:
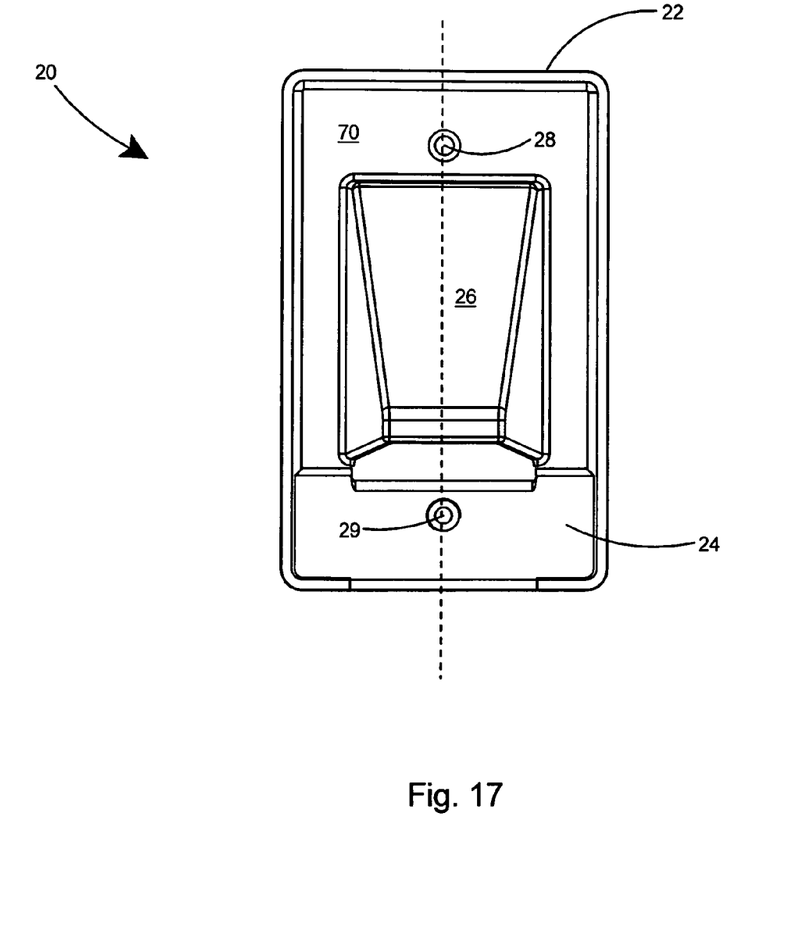
FIG. 17 is a front view of the reversible protective cable chute assembly of the present invention with the panel assembled onto the cover plate.

As shown in FIG. 17, with the panel 24 and cover plate 22 joined together to form the reversible protective cable chute assembly 20, the mounting aperture 28 in the cover plate 22 and the mounting aperture 29 in the panel 24 are aligned along a vertical axis 94 through the cover plate 22. The mounting apertures 28 and 29 are of a spacing and pattern to match the bores 96 of a conventional electrical box 39 or low voltage frame (see FIG. 1).

With reference to FIG. 7, the cable shield 26 portion of the cover plate 22 further includes a planar horizontal portion 98 extending from the front surface 46 of the cover plate 22 and a vertical lip 100 extending downward from the outer wall 56. The cover plate 22 includes the interior plate portion 68 which is recessed a substantial distance from the raised periphery 64. The recessed interior plate portion 68 creates a recessed area 70 on each side of the cover plate that enables the raised periphery 64 of the cover plate 22, when mounted to a wall (not shown), to contact the wall. For those situations in which an electrical box or low voltage frame (not shown) project slightly from the wall, as is often encountered, the wall is contacted by the raised periphery 64 thereby enabling the electrical box or low voltage frame to project into the recessed area 70. This enables the protective cable chute assembly to mount flush against the wall for those cases in which the electrical box or low voltage frame project beyond the outer wall surface. The interior plate portion 68 on each side of the cover plate 22 is recessed a depth or distance D1 from the raised periphery 64. Preferably, the recessed depth or distance D1 is at least 0.065 inch to enable sufficient recessed area for accommodating electrical boxes or low voltage frames (not shown) that extend beyond the wall.

Referring to FIG. 1, in forming the reversible protective cable chute assembly 20 of the present invention, preferably the cover plate 22 and the panel 24 are each molded in one piece of plastic. The cover plate 22 and panel 24 are preferably molded of various plastics including polycarbonate, polyvinyl chloride, acrylonitrile-butadiene styrene, and polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A reversible protective cable chute assembly for routing cables through a wall comprising:
   a cover plate including a first end, a second end and a front surface and a rear surface;
   an opening extending inward from said second end of said cover plate, said opening dividing said second end of said cover plate into two end portions;

a cable shield extending outward from said front surface of said cover plate around a portion of said opening, said cable shield including sidewalls and an outer wall, said outer wall and said sidewalls terminating in a lower edge on said cable shield;

a cable opening defined by said lower edge of said cable shield;

a panel extending between said end portions of said cover plate; and a fastening arrangement for securing said panel and said cover plate to an electrical box or low voltage frame, whereby said panel may be removed from said electrical box or low voltage frame without removing said cover plate from said electrical box or low voltage frame.

2. The reversible protective cable chute assembly of claim 1 wherein said fastening arrangement includes an aperture in said cover plate at said first end;

an aperture in said panel; and fasteners for securing through said apertures into a conventional electrical box or low voltage frame.

3. The reversible protective cable chute assembly of claim 2 wherein said apertures in said cover plate and said panel are aligned along a vertical axis through said cover plate; and said apertures of a spacing and pattern to match the bores of a conventional electrical box or low voltage frame.

4. The reversible protective cable chute assembly of claim 3 wherein said apertures in said cover plate and in said panel are two-way apertures; and said two-way apertures include countersunk areas on said front surface and on said rear surface of said cover plate.

5. The reversible protective cable chute assembly of claim 1 including an aperture in each of said end portions.

6. The reversible protective cable chute assembly of claim 5 wherein said panel includes two ends, a front surface, and a rear surface; and a post extending from said rear surface of said panel at each of said ends.

7. The reversible protective cable chute assembly of claim 6 including an alignment arrangement for aligning said panel with said cover plate.

8. The reversible protective cable chute assembly of claim 7 wherein said alignment arrangement includes said apertures in said end portions of said cover plate;

said posts on said panel; and said posts of a size and spacing to engage said apertures in said end portions of said cover plate.

9. The reversible protective cable chute assembly of claim 1 including a raised periphery around the outer edge of said cover plate;

a thin interior plate portion on said cover plate interior of said raised periphery; and a recessed area on each of said front surface and said rear surface of said cover plate, said recessed area on said front surface of said cover plate extending between said thin interior plate portion and said raised periphery of said cover plate, said recessed area on said rear surface of said cover plate extending between said thin interior plate portion and said raised periphery of said cover plate.

10. The reversible protective cable chute assembly of claim 1 wherein said cable shield includes a planar horizontal portion extending from said front surface of said cover plate; and said cable shield includes a vertical lip extending downward from said outer wall.

11. The reversible protective cable chute assembly of claim 1 wherein said cable opening is a trapezoidal shape.

12. The reversible protective cable chute assembly of claim 5 wherein said sidewalls of said cable shield slope inward at an angle with respect to an axis perpendicular to said front surface of said cover plate.

13. The reversible protective cable chute assembly of claim 12 wherein the angle of the sidewalls of the cable shield with respect to the axis perpendicular to the front surface of the cover plate is between 10 and 20 degrees.

14. The reversible protective cable chute assembly of claim 1 wherein said cable chute may be mounted to an electrical box on a wall in any one of four orientations.

15. The reversible protective cable chute assembly of claim 14 wherein said four orientations include a first orientation with said cable shield extending outward from said electrical box and said cable opening facing downward;

a second orientation with said cable shield extending outward from said electrical box and said cable opening facing upward;

a third orientation with said cable shield extending inward toward said electrical box and said cable opening facing downward; and a fourth orientation with said cable shield extending inward toward said electrical box and said cable opening facing upward.

16. The reversible protective cable chute assembly of claim 1 wherein said cover plate is molded in one piece of plastic; and said panel is molded in one piece of plastic.

17. The reversible protective cable chute assembly of claim 15 wherein said plastic is selected from the group including polycarbonate, polyvinyl chloride, acrylonitrile-butadiene styrene, and polyethylene.

18. The reversible protective cable chute assembly of claim 9 wherein said recessed area is at least 0.065 inch.

19. A two-piece reversible protective cable chute assembly for routing cables through a wall comprising:

a first piece cover plate including a first end, a second end, a front surface, an opening extending inward from said second end of said cover plate and dividing said second end into two end portions;

a second piece removable panel extending between said end portions at said second end of said cover plate;

a cable shield extending outward from said front surface of said cover plate around a portion of said opening;

a cable opening defined by said lower edge of said cable shield;

an aperture in said cover plate for securing said cover plate to an electrical box or low voltage frame;

an aperture in said removable panel for securing said panel to said electrical box or low voltage frame; and fasteners for securing through said apertures into a conventional electrical box or low voltage frame.

20. The reversible protective cable chute assembly of claim 19 wherein said cover plate includes an aperture in each of said end portions;

said panel includes two posts; and said apertures in said end portions of said cover plate and said posts on said panel provide an alignment arrangement for aligning said removable panel with said end portions of said cover plate.

* * * * *